Nov. 28, 1950
O. APPEL
2,531,493
METHOD OF CONTROLLING COMBUSTION
IN INTERNAL-COMBUSTION ENGINES
Original Filed July 22, 1943
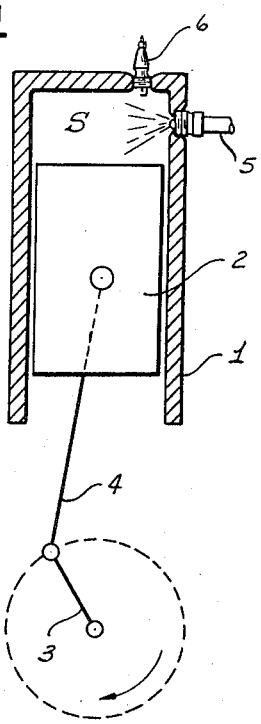
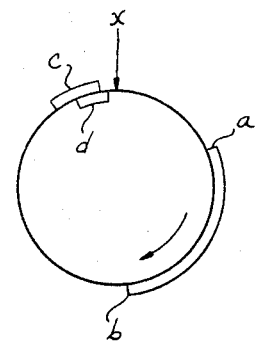
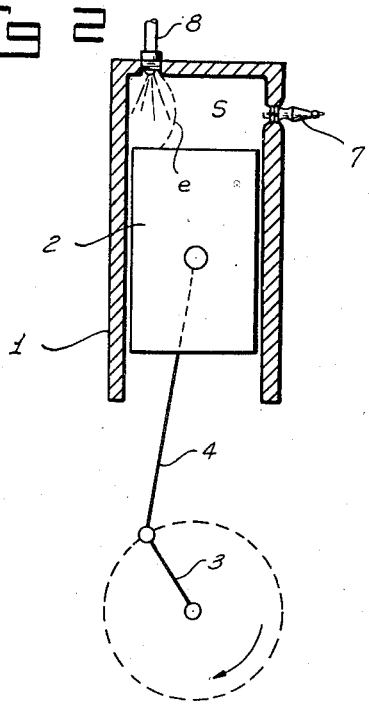
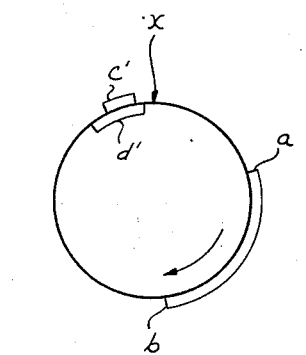
INVENTOR
OSCAR APPEL
BY
Alfred W. Vibber
ATTORNEY Patented Nov. 28, 1950

2,531,493

UNITED STATES PATENT OFFICE 2,531,493

METHOD OF CONTROLLING COMBUSTION IN INTERNAL-COMBUSTION ENGINES

Oscar Appel, Paterson, N. J.

Continuation of application Serial No. 495,722, July 22, 1943. This application August 7, 1946, Serial No. 688,981

2 Claims. (Cl. 123—1)

Internal-combustion engines using liquid fuel may be regarded as existing in two general types—the type in which the total quantum of the fuel, by a carburetor or by spraying, is first mixed with the total quantum of the air, as before or during compression, the mixture is then compressed to a state in which the temperature of the mixture is less than the compression-ignition temperature thereof, and finally locally effective and supplementary heat (afforded by a spark) is applied to the mixture; and the type (commonly known as the Diesel or compression-ignition engine) in which the air alone (or it may be a mixture of the air and a part of the fuel) is first compressed to the state in which the indicated fluid content is high enough in temperature to initiate combustion when more of the fuel is then added thereto, and then the latter fuel is, as by spraying, delivered progressively to said content. In each case what is contemplated is that the combustion shall be progressive as distinguished from occurring as detonation (or the simultaneous combustion of the whole or a substantial part of the whole content of said space)—in the first type because, the compression of the already complete or ultimate mixture being short of the compression-ignition temperature, the indicated supplementary heat expedient acts more or less locally to initiate the combustion which continues or progresses due to the heat of such combustion plus the heat of a compression; and in the second type because the spraying is itself progressive and so progressively goes to complete the ultimate mixture, with consequent progressive combustion thereof.

The present invention relates to engines of the first indicated type, or what I herein term the "igniter-dependent" type, thus to distinguish from the Diesel engine wherein ignition depends on compression to bring the fuel-air mixture at least approximately to the temperature for ignition, and it consists in an improved method of effecting combustion in such igniter-dependent engines whereby to avoid more completely than has heretofore been possible the mentioned detonation in any part of the fuel-air mixture not yet consumed by normal combustion instituted by a timed ignition. According thereto, given what I shall hereinafter term the "operating space" of the engine, the total quantum of the air constituent of the ultimate mixture is incorporated in said space and the fluid content of such space is compressed to the same state that said ultimate mixture would be compressed short of the ignition-point thereof in order to effect combustion only by resort to supplementary heat; during the period of such incorporating and compressing only a part of the total quantum of the fuel constituent of said ultimate mixture is introduced into said space; and, while the resulting preliminary mixture remains at the temperature at which combustion thereof will be initiated only by resort to supplementary heat, to a limited part of the fuel-air content present in said space extraneously derived heat at sufficient temperature to initiate combustion thereof is suddenly applied and the remaining part of the fuel is sprayed into said space.

In Patent No. 2,012,086, to one Mock (incidentally, not for what I have termed an igniter-dependent type but a Diesel type engine), air is admitted to the cylinder space and therefrom passes to a combustion-chamber-adjunct of such space and thence to a so-called flame-chamber containing a glow-plug as an igniter, the combustion chamber being formed to maintain the air whirling therein in the form of a torus and the flame chamber being adapted to maintain in calm state a body of fluid, and, after some fuel has been sprayed into the isolated body of air in the flame chamber, and the heat of compression has raised the temperature of the mixture adjacent the igniter to its ignition point and (with due regard for a phenomenon known as ignition-delay inherent in engines fully or partially dependent upon compression for ignition) ignition is established thus to form a localized calm flaming preliminary mixture in the flame chamber, a second charge of fuel is sprayed through this calm flaming mixture into the whirling air-torus in the combustion chamber. My method distinguishes from the method thus characterized in that, being applied to an igniter-dependent type engine, the spraying is not directed through an isolated portion of the engine space containing a constantly active igniting medium and in which a calm flame is present, but to a space containing a preliminary mixture and having no provision for isolating flame and which space I therefore term the "operating space" of the engine. Such "operating space" may be the usual space coactive with the piston in effecting intake and compression. Further, the ignition is effected suddenly in the form of extraneously derived heat, as a spark.

In the appended claims the order of suddenly applying extraneous heat and the spraying is not essential. I may suddenly apply the extraneously derived heat at the indicated temperature during or after the spraying of the remaining part of the fuel; or I may suddenly apply the extraneously derived heat at said temperature to the preliminary mixture and effect the spraying during the combustion that is initiated by such application of the heat. A distinct feature of novelty of my invention is that the heat is extraneously derived and suddenly applied to a limited part of the fuel-air content, thus distinguishing from known methods in which the heat is not extraneously derived nor is it suddenly applied but exists stored in the walls of the cylinder or some adjunctive space thereof such as a retort, being the heat of previous combustion.

In reference to the second of the two indicated ways it is noted as follows: It is known that when ignition of a fuel-air mixture is effected and combustion proceeds from the igniter, a portion of the mixture (usually remote from the igniter) becomes compressed, as an incident of more or less of the first part of the combustion process, to the compression-ignition point, with consequent detonation of such portion. An advantage of my method in such a case is that the discharge of said remaining part of the fuel has the effect of cooling the preliminary mixture so that detonation, of such an isolated limited portion of the mixture is prevented; and I preferably direct the said remaining part of the fuel constituent to such limited portion, the incoming fuel acting quite advantageously to cool said portion and thus prevent compression-ignition of said limited portion.

To illustrate possible conditions which may exist in the practice of my method, but without being limited thereby, I show the same in the accompanying drawing diagrammatically and in the case of a four-stroke engine during an intake and a compression stroke, Figs. 1 and 2 respectively showing the first and second of the two ways above set forth; and Figs. 3 and 4 showing, during an intake and a compression stroke, the order in which injection and ignition occur according to what is shown by Figs. 1 and 2, respectively.

In Figs. 1 and 2, 1 is the cylinder and 2 the piston of the engine, the latter being connected with the engine crank 3 by the pitman or link 4. In both figures the part of the fuel which goes to form the aforesaid preliminary mixture is assumed to have been introduced to the operating space s of the engine during the intake stroke or in the period from a to b in Fig. 3 or Fig. 4 and the piston is in the position at which such mixture has been compressed to the same state that it would be compressed, if the whole quantum of each of the air and fuel constituents were present, in order to undergo combustion only by resort to supplementary heat. Top dead center is indicated in Figs. 3 and 4 by the character x. Said operating space is as hereinbefore defined.

In Fig. 1, 5 is the means, as an injector in the form of a spray nozzle, for progressively discharging the aforesaid remaining part of the fuel and 6 is the means (here assumed to be a spark-plug) by which the extraneously derived supplementary heat is here applied. The period of injection (or progressive discharge of said remaining part of the fuel) is indicated in Fig. 3 by the arc c and the period within which the supplementary heat is assumed to become effective is indicated by the arc d, the inception of the latter period being during the injection period. The relative positions of the means 5 and 6 as here shown are of course not particularly material in this case.

In Fig. 2, 8 is the spray nozzle and 7 a spark-plug, they being so positioned that the spray is discharged to the preliminary mixture at that portion thereof, as at the left of the dotted arcuate line e, which tends to be compresesd to the compression-ignition point by combustion of the remaining portion of said mixture previously initiated by the spark plug. The period of injection in this case is indicated in Fig. 4 by the arc c' and the period in which the spark may become active is indicated by the arc d', such period beginning prior to period c'.

It will be understood that in either case the one injector, as a spray nozzle, may be used to discharge both the fuel constituent of the preliminary mixture and the remaining part of the fuel and there may be progressive discharge of fuel for the forming of the preliminary mixture either with or to the air of such mixture.

Of course, also it is of advantage to have the fuel of the preliminary mixture vaporized as completely as possible at the time the remaining part of the fuel constituent is discharged into the operating space. Hence, I prefer to form the preliminary mixture during the intake period of the engine, the vaporizing being an incident of presence of heat or reduction of pressure.

Engines of the second type first herein referred to have approximate compression-range limits in the ratios of 12 and 25 to 1. Generally speaking, engines of the first of these types using fuel which possesses no special detonation-inhibiting expedients have approximate compression-range limits in the ratios of 6 and 2 to 1. In the case of the latter type of engines if the mixture is compressed more than six times, in the absence of special detonation-inhibiting expedients detonation inevitably occurs.

According to my invention an engine into whose operating space the fuel is sprayed and in the operation of which heat supplementing the heat of compression is resorted to may be operated at a substantially higher compression-range limit than 6. This is of course because detonation of the preliminary mixture, being too lean to undergo combustion as an incident of temperature-rise due only to compression, is avoided on such compression, and such detonation is avoided subsequently because the mixture following ignition is made to assume its ultimate richness progressively, even where the combustion is initiated in the preliminary mixture.

This application is a continuation of my application Ser. No. 495,722, filed July 22, 1943, now abandoned.

Having thus fully described my invention what I claim is:

1. A method of operating a spark ignition internal combustion engine, the operation of which is subject to limitation due to detonation, said engine having a cylinder, piston and combustion chamber, which comprises compressing a combustible mixture of fuel and air in said combustion chamber, spark igniting said combustible mixture to form a flame front advancing to trap and highly heat end gases of combustible composition in a zone of said combustion chamber, said flame front tending to raise the temperature and pressure of said end gases sufficiently to cause spontaneous ignition and resultant detonation, and after ignition and said advancement of the flame front through a substantial portion of the combustion chamber on any cycle but prior to the spontaneous ignition of said end gases in said zone on the same cycle, injecting fuel into said zone to change the composition of said end gases and prevent spontaneous ignition and resultant detonation.

2. A method of operating an igniter-dependent internal combustion engine, the operation of which is subject to limitation due to detonation, said engine having a cylinder, piston and combustion chamber, which comprises compressing a combustible mixture of fuel and air in said combustion chamber, locally igniting said combustible mixture to form a flame front advancing to trap and highly heat end gases of combustible composition in a zone of said combustion chamber, said flame front tending to raise the temperature and pressure of said end gases sufficiently to cause spontaneous ignition and resultant detonation, and after ignition and said advancement of the flame front through a substantial portion of the combustion chamber on any cycle but prior to the spontaneous ignition of said end gases in said zone on the same cycle, injecting fuel into said zone to change the composition of said end gases and prevent spontaneous ignition and resultant detonation.

OSCAR APPEL.

REFERENCES CITED

The following references are of record in the file of this patent:

UNITED STATES PATENTS

| Number | Name | Date |
|---|---|---|
| 673,160 | Diesel | Apr. 30, 1901 |
| 959,951 | L'Orange | May 31, 1910 |
| 1,096,405 | Thomson | May 12, 1914 |
| 1,239,523 | Rogers | Sept. 11, 1917 |
| 1,392,556 | Cottard | Oct. 4, 1921 |
| 1,616,157 | Werner | Feb. 1, 1927 |
| 2,012,086 | Mock | Aug. 20, 1935 |
| 2,368,423 | Olsen | Jan. 30, 1945 |